(12) United States Patent
Endoh

(10) Patent No.: US 9,051,483 B2
(45) Date of Patent: Jun. 9, 2015

(54) CARBON NANOTUBE INK COMPOSITION AND A COATING METHOD THEREOF AND A FORMING METHOD OF A THIN FILM CONTAINING CARBON NANOTUBES

(75) Inventor: Hiroyuki Endoh, Tokyo (JP)

(73) Assignee: NEC CORPORATION, Tokyo (JP)

( * ) Notice: Subject to any disclaimer, the term of this patent is extended or adjusted under 35 U.S.C. 154(b) by 78 days.

(21) Appl. No.: 13/976,857

(22) PCT Filed: Dec. 27, 2011

(86) PCT No.: PCT/JP2011/080193
§ 371 (c)(1),
(2), (4) Date: Jun. 27, 2013

(87) PCT Pub. No.: WO2012/091002
PCT Pub. Date: Jul. 5, 2012

(65) Prior Publication Data
US 2013/0273257 A1    Oct. 17, 2013

(30) Foreign Application Priority Data
Dec. 28, 2010 (JP) ................................ 2010-292851

(51) Int. Cl.
| | | |
|---|---|---|
| C09D 11/52 | (2014.01) | |
| C09D 11/324 | (2014.01) | |
| C09D 11/38 | (2014.01) | |
| B05D 3/02 | (2006.01) | |
| B05D 1/02 | (2006.01) | |
| B82Y 30/00 | (2011.01) | |
| B82Y 40/00 | (2011.01) | |
| H01B 1/24 | (2006.01) | |
| C09D 11/30 | (2014.01) | |
| C01B 31/02 | (2006.01) | |

(52) U.S. Cl.
CPC .............. *C09D 11/30* (2013.01); *C09D 11/38* (2013.01); *C09D 11/324* (2013.01); *C09D 11/52* (2013.01); *C01B 31/0273* (2013.01); *B82Y 30/00* (2013.01); *B82Y 40/00* (2013.01)

(58) Field of Classification Search
CPC ...... C09D 11/324; C09D 11/38; C09D 11/52; H01B 1/24; H05K 1/097; B82Y 30/00; B82Y 40/00; B05D 3/02; B05D 1/02
USPC ................ 106/31.92, 31.77, 31.78; 252/510; 427/384, 421.1
See application file for complete search history.

(56) References Cited

U.S. PATENT DOCUMENTS

| | | | | |
|---|---|---|---|---|
| 8,309,992 | B2 * | 11/2012 | Toguchi et al. | 257/213 |
| 8,389,987 | B2 * | 3/2013 | Toguchi et al. | 257/40 |
| 8,870,359 | B2 * | 10/2014 | Endoh | 347/100 |
| 2004/0023514 | A1 * | 2/2004 | Moriya et al. | 438/778 |
| 2008/0138704 | A1 * | 6/2008 | Mizuta et al. | 429/203 |
| 2010/0068461 | A1 | 3/2010 | Wallace et al. | |
| 2010/0224862 | A1 * | 9/2010 | Endoh et al. | 257/24 |
| 2012/0295406 | A1 * | 11/2012 | Numata et al. | 252/510 |

FOREIGN PATENT DOCUMENTS

| | | |
|---|---|---|
| JP | 2002-255528 A | 9/2002 |
| JP | 2009-541198 A | 11/2009 |
| JP | 2010-180263 A | 8/2010 |
| WO | WO 2011/016172 A1 * | 2/2011 |
| WO | WO 2011/090029 A1 * | 7/2011 |

OTHER PUBLICATIONS

English translation of JP 2010/180263; Aug. 2010.*
English translation of JP 2002/255528; Nov. 2002.*
Sander J Tans et al., "Room-temperature transistor based on a single carbon nanotube", Letters to Nature, May 1998, pp. 49-52, vol. 393.
R. Martel et al., "Single and multi-wall carbon nanotube field-effect transistors", Applied Physics Letters, Oct. 1998, pp. 2447-2449, vol. 73, No. 17.
S. J. Wind et al., "Vertical scaling of carbon nanotube field-effect transistors using top gate electrodes", Applied Physics Letters, May 2002, pp. 3817-3819, vol. 80, No. 20.
Kai Xiao et al., "High-mobility thin-film transistors based on aligned carbon nanotubes" Applied Physics Letters, Jul. 2003, pp. 150-152, vol. 83, No. 1.
S. Kumar et al., "Performance of carbon nanotube-dispersed thin-film transistors", Applied Physics Letters, 2006, pp. 143501-1-143501-3, vol. 89.
Neerja Saran et al., "Fabrication and Characterization of Thin Films of Single-Walled Carbon Nanotube Bundles on Flexible Plastic Substrates", J. Am. Chem. Soc., 2004, pp. 4462-4463, vol. 126.
Zhuangchun Wu et al., "Transparent, Conductive Carbon Nanotube Films", Science, 2004, pp. 1273-1276, vol. 305.
Mei Zhang et al., "Strong, Transparent, Multifunctional, Carbon Nanotube Sheets", Science, 2005, pp. 1215-1219, vol. 309.
Yangxin Zhou et al., "A method of printing carbon nanotube thin films", Applied Physics Letters, 2006, pp. 123109-1-123109-3, vol. 88.
International Search Report of PCT/JP2011/080193 dated Mar. 27, 2012.

* cited by examiner

Primary Examiner — Helene Klemanski
(74) Attorney, Agent, or Firm — Sughrue Mion, PLLC

(57) ABSTRACT

A carbon nanotube composition that exhibits an excellent printability when use is made for a printing device, especially, exhibits an excellent prevention of drying on the printing apparatus. A carbon nanotube ink composition comprises carbon nanotubes, a solvent, an imidazolidinone compound represented by chemical formula (1) and a propylene urea compound represented by chemical formula (2).

20 Claims, No Drawings

CARBON NANOTUBE INK COMPOSITION AND A COATING METHOD THEREOF AND A
FORMING METHOD OF A THIN FILM
CONTAINING CARBON NANOTUBES

TECHNICAL FIELD

Description of Related Application

The present invention claims the priority benefit of Japanese Patent Application No. 2010-292851, filed on Dec. 28, 2010, which application is incorporated herein by reference in its entirety. The present invention relates to a carbon nanotube ink composition containing carbon nanotubes dispersed uniformly therein as a dispersoid, and relates particularly to a carbon nanotube ink composition capable of forming inks that exhibit excellent printability from a printing device.

BACKGROUND

Carbon nanotubes have a circular cylindrical structure composed of a rolled graphene sheet, and generally have a straw-shaped structure. Carbon nanotubes are classified into single walled carbon nanotubes (SWCNT) composed of a single tube, double walled carbon nanotubes (DWCNT) having a laminated structure (two-layer structure) composed of two tubes having different diameters, and multi-walled carbon nanotubes (MWCNT) having a laminated structure (multi-layer structure) composed of a plurality of tubes having different diameters, and much applied research is being conducted utilizing the properties of these respective structures.

For example, SWCNT may adopt a structure having semiconductor properties depending on the way in which the graphene sheet is rolled, and because they are expected to exhibit superior mobility, applications of these SWCNT to thin-film transistors (TFT) hold considerable promise, and research into such applications is being actively pursued. For example, reports of Non Patent Literatures 1 to 4 and the like indicate that TFTs using carbon nanotubes exhibit performance that is comparable to or exceeds that of silicon.

In those cases where carbon nanotubes are used as a channel semiconductor material, the TFT is produced by either dispersing one or several carbon nanotubes or dispersing a multitude of carbon nanotubes. In the case where a small number of the carbon nanotubes are used, because the length of the carbon nanotubes is generally approximately 1 micrometer or less, microfabrication techniques are required during the production of the TFT, and the so-called channel length between a source electrode and a drain electrode must be produced on the sub-micron scale.

In contrast, in those cases where a multitude of carbon nanotubes are used, because the network of the carbon nanotubes is used as a channel, the length of the channel can be increased, and thus allowing an easy production. As a reported example of a method of producing TFTs by dispersing a multitude of carbon nanotubes, Non-Patent Literature (NPL) 5 and the like are listed.

Furthermore, since DWCNT and MWCNT exhibit high levels of electrical conductivity, applications to electrode materials, wiring materials, antistatic films and transparent electrodes hold considerable expectation, and research into such applications is progressing.

In order to form a thin film by dispersing a multitude of carbon nanotubes, the thin film can be formed easily by using a solvent or dispersion of carbon nanotubes. Non-Patent Literatures 6 to 9 and the like report methods of forming thin films of carbon nanotubes from the solution or dispersion.

By forming a thin film of carbon nanotubes by a process using the solution or dispersion with carbon nanotubes as a material of semiconductor layers, not only by applying hard materials such as glass but also applying resin(s) or plastic(s) to elements, devices or product substrates or materials, flexibility can also be imparted to the overall element, device or product. Moreover, since a coating process can be employed, meaning a production method that employs a coating process or printing process can be used to achieve low costs of the element, device or product.

The present inventor has reported a composition exhibiting excellent dispersibility of carbon nanotubes and storage stability in addition to exhibiting excellent adaptability to a printing device in Patent Literature (PTL) 1. This is a composition containing carbon nanotubes, a solvent and glycol ether(s).

[PTL 1]
Japanese Patent Publication No. 2010-180263
[NPL 1]
S. J Tans et al., Nature, vol. 393, page 49, 1998
[NPL 2]
R. Martel et al., Appl. Phys. Lett., 73, 17, page 2447, 1998
[NPL 3]
S. Wind et al., Appl. Phys. Lett., 80, 20, page 3817, 2002
[NPL 4]
K. Xiao et al., Appl. Phys. Lett., 83, 1, page 150, 2003
[NPL 5]
S. Kumar et al., Appl. Phys. Lett., 89, page 143501, 2006
[NPL 6]
N. Saran et al., J. Am. Chem. Soc., 126, page 4462, 2004
[NPL 7]
Z. Wu et al., Science, vol. 305, page 1273, 2004
[NPL 8]
M. Zhang et al., Science, vol. 309, page 1215, 2005
[NPL 9]
Y. Zhou et al., Appl. Phys. Lett., 88, page 123109, 2006

SUMMARY

The disclosures of the Patent Literature and Non-Patent Literatures given above are hereby incorporated in their entirety herein by reference thereto. The following analysis on the related art is given by the present invention.

However, preparing the solution or dispersion of carbon nanotubes is extremely difficult, and in order to prepare the dispersion of carbon nanotubes that exhibits excellent storage stability, it has been necessary to use an ionic surfactant or a dispersant having a special structure. Although these surfactant(s) and dispersant(s) can improve storage stability, if an ink produced by using this dispersion is used for printing, then printability often tends to be poor, and the ink often affects a printing device.

In light of the above circumstances, it is an object of the present invention to provide a carbon nanotube composition that exhibits an excellent dispersibility of carbon nanotubes and storage stability, being a dispersion containing carbon nanotubes. Further, it is an object to provide a carbon nanotube composition that exhibits an excellent printability when use is made for a printing device, especially, exhibits an excellent prevention of drying on the printing device.

The present inventor has already reported Patent Literature 1, further, as a result of intensive investigation aimed at solving the above problem, the inventors of the present invention discovered that by adding a compound having a specific structure to a carbon nanotube ink composition, a carbon nanotube ink composition exhibiting excellent storage stability as an ink and printability, especially, exhibiting an excellent prevention of drying of ink(s) on a printing device, can be obtained, which resulted in the present invention.

According to a first aspect, a carbon nanotube ink composition according to the present invention comprises carbon nanotubes, a solvent, an imidazolidinone compound represented by the following chemical formula (1) and a propylene urea compound represented by the following chemical formula (2).

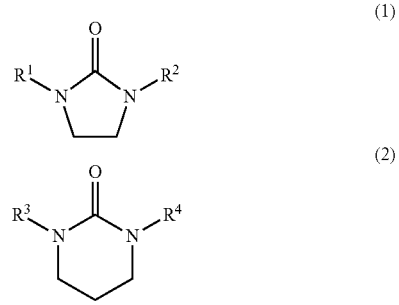

According to a second aspect, there is provided a coating method of a carbon nanotube ink composition according to the present invention, the method comprising a process of spraying the carbon nanotube ink composition according to the above first aspect from an inkjet head device.

According to a third aspect, there is provided a forming method of a thin film containing carbon nanotubes according to the present invention, the method comprising a process of spraying the carbon nanotube ink composition according to the above first aspect from an inkjet head device to a material substrate; and a process of evaporating the solvent by heating a material substrate in which the carbon nanotube ink composition is sprayed.

In the carbon nanotube ink composition containing carbon nanotubes, a solvent, the imidazolidinone compound represented by the above chemical formula (1) and the propylene urea compound represented by the above chemical formula (2), the imidazolidinone compound and the propylene urea compound are a compound that has a cyclic imide structure and hydrocarbon groups (especially, methyl groups) on two nitrogens. While each of the imidazolidinone compound and the propylene urea compound has a similar structure, only a difference between them being the number of carbons constituting a ring, in the nanotube ink, the small imidazolidinone compound in size particularly contributes to the dispersion stability of nanotubes, the large propylene urea compound in size contributes to the improvement of the drying-preventing property on a printing device.

In addition, if a hydrocarbon group which is contained in the imidazolidinone compound and propylene urea compound is a straight chained or branched, saturated or unsaturated hydrocarbon group having affinity to carbon nanotubes, it can be essentially substituted. A straight chained or branched, saturated hydrocarbon group of approximately 1 to 5 carbon atoms is preferred and a methyl group-substituted ones is most preferred because it can be easily available.

While urea is often used for the prevention of drying of inks in general, in the case of inks in which nanotubes are dispersed, drying-preventing agents other than urea have been required because the dispersion stability of carbon nanotubes is deteriorated. In this regard, since the propylene urea compound of the present invention not only acts for the prevention of drying on a printing device but also does not affect the dispersion stability of carbon nanotubes, the propylene urea compound is an ideal additive.

Since this imidazolidinone compound and propylene urea compound have a portion of an imide group and a portion of an alkyl chain, good dispersion state can be maintained owing to the presence of a site that exhibits affinity to carbon nanotubes and a site that exhibits affinity to a solvent in the molecules.

As described heretofore, according to the carbon nanotube ink composition of the present invention, a carbon nanotube ink composition that exhibits excellent printability and dispersion stability can be provided.

PREFERRED MODES

In the above first aspect, it is preferable that all $R^1$, $R^2$, $R^3$ and $R^4$ are a methyl group.

Also, it is preferable that the solvent is water or an organic solvent.

Also, it is preferable that a content rate of the carbon nanotubes is from 100 ppm (0.01% by weight) to 1% by weight.

Also, it is preferable that a total content rate of the imidazolidinone compound and the propylene urea compound is from 100 ppm to 5% by weight.

Also, it is preferable that a total content rate by weight of the imidazolidinone compound and the propylene urea compound is greater than a content rate by weight of the carbon nanotubes.

Also, it is preferable that a polyethylene glycol compound containing an alkoxy group of ten or more carbon atoms as a substituent is further contained.

Also, it is preferable that a content rate by weight of the polyethylene glycol compound is a 0.5 to 1.5 times a content rate by weight of the carbon nanotubes. Also, it is further preferable that a content rate by weight of the polyethylene glycol compound is the same as a content rate by weight of the carbon nanotubes.

In the carbon nanotube ink composition of the present invention, there are no particular limitations on a content (% by weight) of the carbon nanotubes. However, if the content of the carbon nanotubes exceeds 10%, then the viscosity of the ink composition itself tends to increase, resulting in a paste-like composition. If printing, especially the use for an inkjet device, is considered, a concentration up to approximately 1% is easy to operate. Also, if the content is less than 0.01% (100 ppm), CNT concentration in a CNT thin film becomes too low, overspraying (repeated application) and the like are needed, and thus the number of processes increase. If the content is greater than 1% by weight, the dispersion stability of inks deteriorates steeply. Therefore, it is preferable that the content is in a range of 0.01 to 1% by weight.

There are no particular limitations on the contents of the imidazolidinone compound represented by chemical formula (1) and the propylene urea compound represented by chemical formula (2). However, since printing stability and dispersion stability decrease if a concentration in inks is markedly small, the content of approximately 100 ppm to 5% as a concentration in inks is preferred. If the concentration becomes lower than that of carbon nanotubes in terms of the weight ratio, dispersion stability decreases, the phenomena of precipitation and sedimentation of carbon nanotubes occur, further, drying of inks occurs on a printing device, as a result, becoming unable to print.

Also, dispersion stability in higher concentration can be provided by further containing a polyethylene glycol compound containing an alkoxy group of ten or more carbon atoms as a substituent in the carbon nanotube composition, along with the imidazolidinone compound represented by chemical formula (1) and the propylene urea compound represented by chemical formula (2).

The alkoxy group of 10 or more carbon atoms may be either a saturated alkoxy group or an unsaturated alkoxy group, and high dispersion stability can be provided by either a straight chained alkoxy group or a branched alkoxy group, whereas particularly high dispersion stability is provided if a straight chained saturated alkoxy group of 18 to 20 carbon atoms is used.

By adding this polyethylene glycol compound containing the alkoxy group of ten or more carbon atoms as a substituent, carbon nanotubes can be stably dispersed up to 10% of a carbon nanotube concentration. In addition, there are no particular limitations on an additive amount of the polyethylene glycol compound containing the alkoxy group of 10 or more carbon atoms as a substituent, high dispersion stability can be maintained by adding the polyethylene glycol compound at approximately 0.5-1.5 times by weight of an additive amount of carbon nanotubes, preferably by adding it at approximately the same additive amount of carbon nanotubes.

These carbon nanotube ink compositions of the present invention containing carbon nanotubes, a solvent, the imidazolidinone compound represented by chemical formula (1) and the propylene urea compound represented by chemical formula (2) can effectively improve wetting properties of the ink composition relative to members, and therefore, the carbon nanotube ink compositions have very good compatibility with a printing device, when use of the printing device is adopted, high printability can be provided. Particularly, in the case where a carbon nanotube ink composition is discharged by spraying from an inkjet head device, if wetting properties is poor, charging inks within the interior of the inkjet head device and the stable spraying and discharge of inks can not be achieved. However, by using the carbon nanotube ink composition of the present invention, charging inks within the interior of the inkjet head device becomes easy and the stable spraying and discharge of inks can be achieved.

Water or an organic solvent is used as a solvent. As the organic solvent, aliphatic hydrocarbons such as decane, undecane or the like, aromatic hydrocarbons such as toluene, xylene or the like, ketons such as methyl ethyl ketone, cyclohexane or the like, ethers such as diethyl ether, ethyl methyl ether or the like, carboxylic acid alkyl esters such as acetic ether, propionic acid methyl, dichloroethane, N,N-dimethyl formamide or the like are preferably exemplified. Those can be used individually, or in a mixture containing two or more solvents.

EXAMPLES

The present invention will be described below in detail, based on Examples, but the present invention is not limited to the following Examples without departing from the scope of the present invention.

In addition, any of SWCNT, DWCNT, MWCNT can be used for carbon nanotubes, without limitation in the shape. When a carbon nanotube is used as a semiconductor material, SWCNT can be used and, when used as an electro-conductive material, SWCNT, DWCNT and/or MWCNT can be used. Although there are various production methods of carbon nanotubes such as the CVD method, the laser ablation method or the like, carbon nanotubes made by any method can be used.

Example 1

In Example 1, carbon nanotube ink composition 1 was prepared using the following procedure. First, 10 mg of single walled carbon nanotubes prepared by using the Hipco method were weighed into a glass container, and 100 mg of an imidazolidinone compound of chemical formula (1) was added. Subsequently, 10 g of water was added to the glass container, and an ultrasound apparatus was used to subject the mixture to ultrasound treatment for one hour. Immediately after the ultrasound treatment, the dispersion displayed a uniform black state, and no residue or sediment was observed. Further, this dispersion was inspected 5 days and 10 days after the treatment, similarly to the case immediately after the treatment, no residue or sediment was observed.

The carbon nanotube ink composition 1 was charged into an inkjet head manufactured by Konica Minolta Holdings, Inc, and the state of the charging of inks and the state of the spraying of inks were inspected. When the inkjet head charged with the carbon nanotube ink composition 1 was operated, a stable state of the discharge of inks was obtained when immediately after charging. Then the inkjet head was left to stand, and the inkjet head was operated after 5 days of standing, clogging occurred in a part of nozzles. Then after 10 days, clogging occurred in half or more of the nozzles.

Example 2

In Example 2, carbon nanotube ink composition 2 was prepared using the following procedure. First, 10 mg of single walled carbon nanotubes prepared by using the Hipco method were weighed into a glass container, and 100 mg of a propylene urea compound represented by chemical formula (2) was added. Subsequently, 10 g of water was added to the glass container, and an ultrasound apparatus was used to subject the mixture to ultrasound treatment for one hour. Immediately after the ultrasound treatment, the dispersion displayed a uniform black state, and no residue or sediment was observed. Further, this dispersion was inspected 5 days and 10 days after the treatment, a small amount of sediment which was not inspected immediately after the treatment, was observed in the bottom portion of the glass container.

The carbon nanotube ink composition 2 was charged into an inkjet head manufactured by Konica Minolta Holdings, Inc, and the state of the charging of inks and the state of the spraying of inks were inspected. When the inkjet head charged with carbon nanotube ink composition 2 was operated, the stable state of the discharge of inks was obtained as immediately after charging the ink compound. Then the inkjet head was left to stand, and the inkjet head was operated after 5 days and 10 days of standing, no clogging was observed.

Example 3

In Example 3, carbon nanotube ink composition 3 was prepared using the following procedure. First, 10 mg of single walled carbon nanotubes prepared by using the Hipco method were weighed into a glass container, and 100 mg of an imidazolidinone compound of chemical formula (1) was added. Further, 100 mg of a propylene urea compound represented by chemical formula (2) was added to obtain the ink composition 3. Subsequently, 10 g of water was added to the glass container, and an ultrasound apparatus was used to subject the mixture to ultrasound treatment for one hour. Immediately after the ultrasound treatment, the dispersion displayed a uniform black state, and no residue or sediment was observed.

Further, this dispersion was inspected 5 days and 10 days after the treatment, similarly to the case immediately after the treatment, no residue or sediment was observed.

The carbon nanotube ink composition 3 was charged into an inkjet head manufactured by Konica Minolta Holdings, Inc, and the state of the charging of inks and the state of the spraying of inks were inspected. When the inkjet head charged with the carbon nanotube ink composition 3 was operated, the stable state of the discharge of inks was obtained as immediately after charging the ink compound. Then the inkjet head was left to stand, and the inkjet head was operated after 5 days and 10 days of standing, no clogging was observed.

Comparative Example 1

With the exception of using urea instead of the compound (2), a carbon nanotube ink composition was prepared in exactly the same manner as Example 3 to obtain carbon nanotube ink composition 101.

Immediately after the ultrasound treatment, the carbon nanotube ink composition 101 displayed a uniform black state, and no residue or sediment was observed. Further, this dispersion was inspected 5 days and 10 days after the treatment, a small amount of sediment which was not inspected immediately after the treatment, was observed in the bottom portion of the glass container.

The carbon nanotube ink composition 101 was charged into an inkjet head manufactured by Konica Minolta Holdings, Inc, and the state of the charging of inks and the state of the spraying of inks were inspected. When the inkjet head charged with the carbon nanotube ink composition 101 was operated, the stable state of the discharge of inks was obtained as immediately after charging the ink compound. Then the inkjet head was left to stand, and the inkjet head was operated after 5 days and 10 days of standing, no clogging was observed.

Example 4

In Example 4, carbon nanotube ink composition 4 was prepared using the following procedure. First, 100 mg of single walled carbon nanotubes prepared by using the Hipco method were weighed into a glass container, and then 100 mg of an imidazolidinone compound of chemical formula (1), 100 mg of a propylene urea compound represented by chemical formula (2), and 1 g of polyethylene glycol (molecular weight: 1000) having $C_{18}H_{37}O$ (lauryl alkoxy group) at the terminals, were added.

Subsequently, 10 g of water was added to the glass container, and an ultrasound apparatus was used to subject the mixture to ultrasound treatment for one hour to obtain the carbon nanotube ink composition 4. Immediately after the ultrasound treatment, the carbon nanotube ink composition 4 displayed a uniform black state, and no residue or sediment was observed. Further the carbon nanotube ink composition 4 was inspected 10 days and 30 days after the treatment, similarly to the case immediately after the treatment, no residue or sediment was observed.

The carbon nanotube ink composition 4 was charged into an inkjet head manufactured by Konica Minolta Holdings, Inc, and the state of the charging of inks and the state of the spraying of inks were inspected. When the inkjet head charged with the carbon nanotube ink composition 4 was operated, the stable state of the discharge of inks was obtained as immediately after charging the ink compound. Then the inkjet head was left to stand, and the inkjet head was operated after 5 days and 10 days of standing, no clogging was observed.

Although the present invention has been described above on the basis of preferred embodiments, carbon nanotube ink compositions according to the present invention are not limited to the configurations described for the above embodiments, and carbon nanotube ink compositions that have undergone various modifications or alterations from the configurations of the above embodiments are also included within the scope of the present invention. The embodiments or examples of the invention can be modified or adjusted within the ambit of the entire disclosures (including claims and figures) of the present invention, and based on the technical scope of the invention. Moreover, various combinations or selections of the various disclosed elements (including each element of claims, examples and figures) are possible within the scope of the claims of the present invention. That is, needless to say, it is understood by those skilled in the art that various changes or modifications can be made to the present invention based on the disclosure of the present invention including the claims and the technological idea of the present invention.

What is claimed is:

1. A carbon nanotube ink composition comprising carbon nanotubes, wherein the carbon nanotube ink composition comprises at least carbon nanotubes, a solvent, an imidazolidinone compound represented by the following chemical formula (1) and a propylene urea compound represented by the following chemical formula (2);

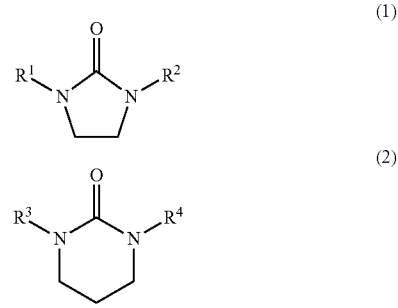

wherein each of $R^1$, $R^2$, $R^3$ and $R^4$ is a straight chained or branched, saturated hydrocarbon group of 1 to 5 carbon atoms.

2. The carbon nanotube ink composition according to claim 1, wherein all $R^1$, $R^2$, $R^3$ and $R^4$ are a methyl group.

3. The carbon nanotube ink composition according to claim 1, wherein said solvent is water or an organic solvent.

4. The carbon nanotube ink composition according to claim 1, wherein a content rate of said carbon nanotubes is from 100ppm to 1% by weight.

5. The carbon nanotube ink composition according to claim 1, wherein a total content rate of said imidazolidinone compound and said propylene urea compound is from 100ppm to 5% by weight.

6. The carbon nanotube ink composition according to claim 1, wherein a total content rate by weight of said imidazolidinone compound and said propylene urea compound is greater than a content rate by weight of said carbon nanotubes.

7. The carbon nanotube ink composition according to claim 1, further comprising a polyethylene glycol compound containing an alkoxy group of ten or more carbon atoms as a substituent.

8. The carbon nanotube ink composition according to claim 7, wherein a content rate by weight of said polyethylene glycol compound is 0.5 to 1.5 times a content rate by weight of said carbon nanotubes.

9. A method for coating a composition containing carbon nanotubes to a material substrate, wherein the method comprises:
a process of spraying a carbon nanotube ink composition comprising at least carbon nanotubes, a solvent, an imidazolidinone compound represented by the following chemical formula (1) and a propylene urea compound represented by the following chemical formula (2)

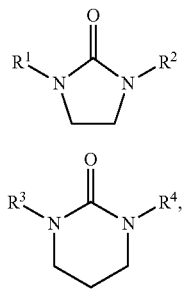
(1)

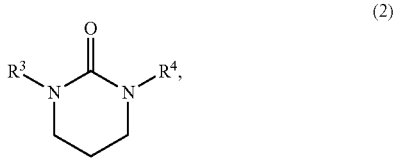
(2)

wherein each of $R^1$, $R^2$, $R^3$ and $R^4$ is a straight chained or branched, saturated hydrocarbon group of 1 to 5 carbon atoms from an inkjet head device.

10. A method for forming a thin film containing carbon nanotubes, wherein the method comprises:
a process of spraying a carbon nanotube ink composition comprising at least carbon nanotubes, a solvent, an imidazolidinone compound represented by the following chemical formula (1) and a propylene urea compound represented by the following chemical formula (2)

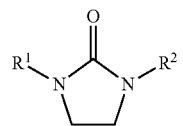
(1)

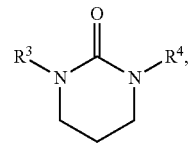
(2)

wherein each of $R^1$, $R^2$, $R^3$ and $R^4$ is a straight chained or branched, saturated hydrocarbon group of 1 to 5 carbon atoms from an inkjet head device to a material substrate; and a process of evaporating said solvent by heating the material substrate in which the carbon nanotube ink composition is sprayed.

11. The method according to claim 9, wherein all $R^1$, $R^2$, $R^3$ and $R^4$ are a methyl group.

12. The method according to claim 9, wherein said solvent is water or an organic solvent.

13. The method according to claim 9, wherein a content rate of said carbon nanotubes is from 100ppm to 1% by weight.

14. The method according to claim 10, wherein all $R^1$, $R^2$, $R^3$ and $R^4$ are a methyl group.

15. The method according to claim 10, wherein said solvent is water or an organic solvent.

16. The method according to claim 10, wherein a content rate of said carbon nanotubes is from 100ppm to 1% by weight.

17. The method according to claim 10, wherein a total content rate of said imidazolidinone compound and said propylene urea compound is from 100ppm to 5% by weight.

18. The method according to claim 10, wherein a total content rate by weight of said imidazolidinone compound and said propylene urea compound is greater than a content rate by weight of said carbon nanotubes.

19. The method according to claim 10, wherein the ink composition further comprises a polyethylene glycol compound containing an alkoxy group of ten or more carbon atoms as a substituent.

20. The method according to claim 19, wherein a content rate by weight of said polyethylene glycol compound is 0.5 to 1.5 times a content rate by weight of said carbon nanotubes.

* * * * *

UNITED STATES PATENT AND TRADEMARK OFFICE
CERTIFICATE OF CORRECTION

| | | |
|---|---|---|
| PATENT NO. | : 9,051,483 B2 | Page 1 of 1 |
| APPLICATION NO. | : 13/976857 | |
| DATED | : June 9, 2015 | |
| INVENTOR(S) | : Hiroyuki Endoh | |

It is certified that error appears in the above-identified patent and that said Letters Patent is hereby corrected as shown below:

IN THE SPECIFICATION

Column 1, after Title insert

-- CROSS REFERENCE TO RELATED APPLICATIONS

This is a National Stage of International Application No. PCT/JP2011/080193 filed December 27, 2011, claiming priority based on Japanese Patent Application No. 2010-292851 filed December 28, 2010, the contents of all of which are incorporated herein by reference in their entirety. --

Signed and Sealed this
Eighth Day of December, 2015

Michelle K. Lee
*Director of the United States Patent and Trademark Office*